Feb. 20, 1968    M. BERMAN    3,369,492
VERTICAL TURBINE PUMP BEARING ARRANGEMENT FOR ABRASIVE SERVICE
Filed June 23, 1966    2 Sheets-Sheet 1

MERRIL BERMAN
INVENTOR.

BY Daniel H. Bobis
Atty

MERRIL BERMAN
INVENTOR.
BY Daniel H. Bobis
Atty

United States Patent Office 3,369,492
Patented Feb. 20, 1968

3,369,492
VERTICAL TURBINE PUMP BEARING ARRANGEMENT FOR ABRASIVE SERVICE
Merril Berman, Denver, Colo., assignor to Worthington Corporation, Harrison, N.J. a corporation of Delaware
Filed June 23, 1966, Ser. No. 559,890
16 Claims. (Cl. 103—102)

ABSTRACT OF THE DISCLOSURE

A drive shaft apparatus for vertical turbine pumps wherein the pump impellers are driven by a hollow shaft which is mounted on and supported by a vertical axle. The bearings connecting the hollow shaft to the axle are not exposed to the fluid being pumped and can be lubricated by an independent lubrication system.

This invention relates to drive shafts and particularly, to means for lubricating vertical pump drive shafts independently of the fluid being pumped by the pumps.

The normal multi-stage vertical turbine pump has several pump bowls, with each bowl having a bearing member for supporting the pump shaft. The bearings associated with the intermediate pump bowls are exposed to, and lubricated by, the fluid being pumped. When the fluid pumped contains abrasive materials such as sand, silt or mill scale the bearings lubricated by this fluid are subject to rapid wear, and consequently pump failure under abrasive conditions is rapid. Attempts have been made to improve bearing life by selection of special bearing materials or injection of non-abrasive-carrying liquids around the bearings during pumping operation, but these attempts have not been entirely successful.

It is, therefore, an object of this invention to provide a vertical turbine pump having bearings which are not exposed to the fluid being pumped.

It is another object of this invention to provide a vertical turbine pump which provides a flow of lubricating fluid to the bearings thereof independently of the fluid being pumped.

A further object of this invention is to provide a multi-stage vertical turbine pump capable of extended bearing life while pumping abrasive fluids.

Yet another object of this invention is a multi-stage vertical turbine pump bearing system which may be readily assembled or disassembled for maintenance purposes.

In order to overcome these problems and achieve the above mentioned objects, the subject invention sets forth a drive shaft apparatus for vertical turbine pumps wherein the pump impellers are driven by a hollow shaft which is mounted on and supported by a vertical axle. The bearings connecting the hollow shaft to the axle are not exposed to the fluid being pumped, and can be lubricated by an independent lubrication system.

Figure 1:
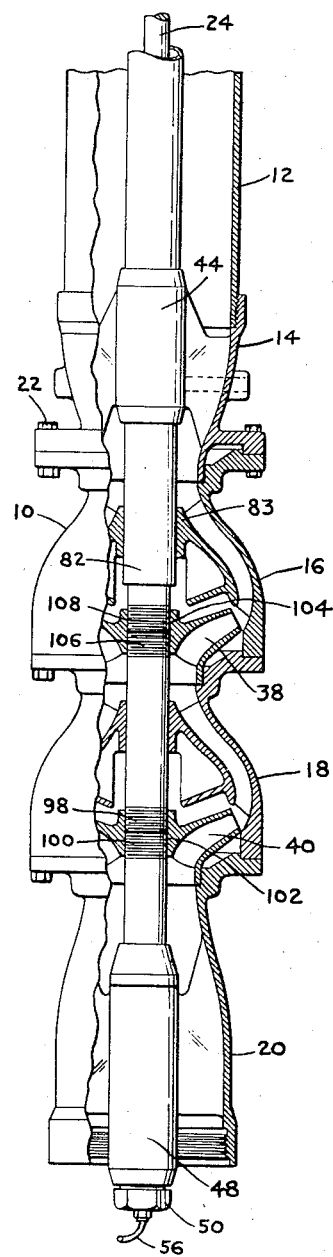
FIGURE 1 is a view in partial sections of one embodiment of a multi-stage vertical turbine pump constructed in accordance with this invention.
Figure 2:
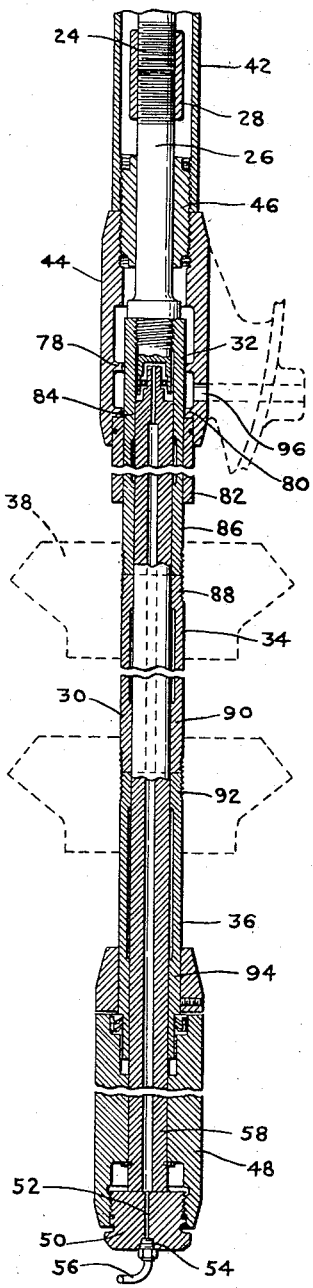
FIGURE 2 is a schematic view of the drive shaft apparatus for the multi-stage vertical turbine pump shown in FIGURE 1.

In the embodiment of the invention illustrated in FIGURES 1 through 4 the bowl assembly 10 of an enclosed type vertical turbine pump depends from the pump discharge head (not shown) by means of a column pipe 12 rigidly connected to a discharge case 14. An upper bowl 16 is connected to and depends from discharge case 14 by means of bolt connections 22. In a similar manner, an intermediate bowl 18 is connected to and depends from upper bowl 16 and a suction case 20 is connected to and depends from intermediate bowl 18. A line shaft 24 transmits power from the drive motor in the pump discharge head (not shown) to a top pump shaft 26 through a shaft coupling 28, the top pump shaft in turn connected to the upper end of a hollow drive shaft 30. Hollow drive shaft 30 is composed of several segments: and upper shaft segment 32; an intermediate shaft segment 34; and a bottom shaft segment 36. Shaft segment 32 is coupled to shaft segment 34 by a second stage impeller 38 situated in upper bowl 16, and, in a similar manner, intermediate shaft segment 34 is coupled to bottom shaft segment 36 by a first stage impeller 40 situated in intermediate bowl 18.

Line shaft 24 and top pump shaft 26 are enclosed by a shaft enclosing tube 42 which is coupled to the upper end of a discharge case collar 44 by a connector bearing 46. The hollow drive shaft extends down into and terminates in a suction case collar 48, the end of said collar being closed by a suction case plug 50 threadably connected thereto. Suction case plug 50 has an axial bore 52 therethrough and a threaded counter bore 54 at the bottom end of the plug for attachment of a lubricating line connection 56 whose function will be explained in greater detail below. Extending from suction case collar 48 and resting upon suction case plug 50 is a tubular axle 58 rising within hollow drive shaft 30 to the proximity of top pump shaft 26.

Figure 3:
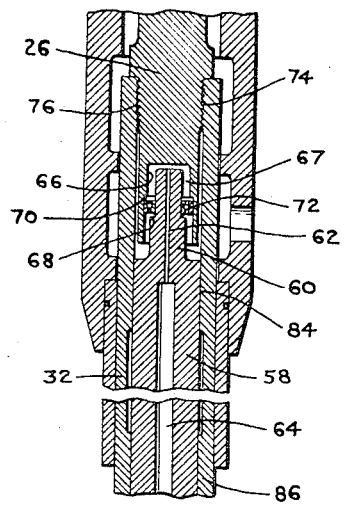
FIGURE 3 is a sectional elevation of the multi-stage vertical turbine pump taken along section 3—3 of FIGURE 1.

As shown in FIGURE 3 a tubular extension 60 is fixed to the end of tubular axle 58, the extension having a bore 62 coaxial with the tubular axle bore 64. Extension 60 fits into a counter bore 66 in the end of top pump shaft 26. A shoulder 68 on the tubular extension and a step 70 in the counter bore of the top pump shaft co-act to form a bearing seat for a radial guide bearing 72 which positions the tubular extension 60 and, therefore, the upper part of tubular axle 58, while at the same time maintaining a spacing between tubular axle extension 60 and counter bore 66 to provide an upper flow passageway 67, communicating the space on top of extension 60 with the top portion of hollow shaft 30.

The upper shaft segment 32 is connected to top pump shaft 26 by means of a threaded section 74 on the end of upper shaft segment 32 and a threaded section 76 on the top pump shaft. Upper shaft segment 32 rotates within discharge case collar 44, but does not make bearing contact with annular members 78 and 80 formed within the discharge case shaft housing, nor is there substantial bearing contact with a throttle bushing 82 disposed between discharge case collar 44 and a collar 83 formed in the upper bowl 16. The bearing forces for upper shaft segment 32 are carried by bearing surfaces 84 and 86 which form sleeve bearings about tubular axle 58. Similar to the bearing surfaces 84 and 86 of upper shaft segment 32 are upper and lower bearing surfaces 88 and 90 respectively on intermediate shaft segment 34, and upper and lower bearing surfaces 92 and 94 respectively of bottom shaft segment 36. Throttle bushing 82 partially seals off discharge case collar 44 from the liquid being pumped. Any liquid which enters the discharge case collar, whether by seeping past throttle bushing 82 or by passing down from shaft enclosing tube 42, is expelled from the housing through a relief port 96 which communicates the area between annular members 78 and 80 with the outer surfaces of discharge case 14.

As shown in FIGURE 1 intermediate shaft segment 34 has a threaded portion 98 at the bottom end thereof and bottom shaft segment 36 has a threaded portion 100 at the top end thereof. First stage impeller 40 has a threaded area 102 on its internal bore which threadably connects with threaded end portions 98 and 100 to act as a coupling between the intermediate and bottom shaft segments while at the same time rigidly connecting the first stage impeller to the hollow drive shaft. In a similar manner, an internally threaded portion 104 in second stage impeller 38 couples a threaded portion 106 at the top end of intermediate shaft segment 34 to a threaded portion 108 at the bottom end of upper shaft segment 32 to connect the upper and intermediate shaft segments and simultaneously fix the second stage impeller to the hollow drive shaft.

Figure 4:
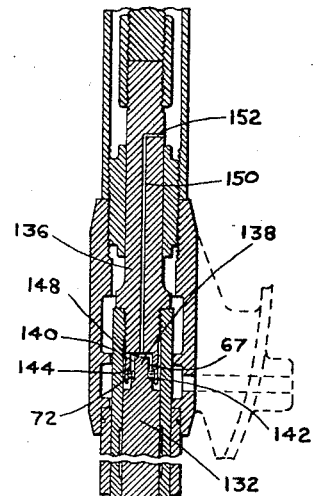
FIGURE 4 is a sectional elevation of the multi-stage vertical turbine pump taken along section 4—4 of FIGURE 1.
Figure 4:
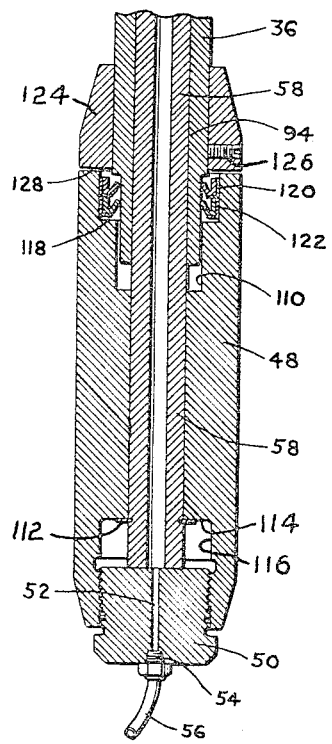

As shown in FIGURE 4, the bottom shaft segment 36 of hollow drive shaft 30 extends into a counter bore 110 of suction case collar 48, the extreme bottom end of the hollow drive shaft 30 being positioned as mentioned above by sleeve bearing surface 94 co-acting with tubular axle 58, the axle in turn positioned by suction case collar 48. In addition, a snap ring 112 seated on tubular axle 58 coacts with an end face 114 of a counter bore 116 in the bottom of suction case collar 48 to prevent any upward movement of tubular axle 58. A lower flow passage 118 is formed between the wall of counter bore 110 and the end of bottom shaft segment 36 to dispose of lubricating fluid which has traveled past the several bearing surfaces of the hollow drive shaft. In order to prevent the fluid being pumped from entering the bearing areas by back-flowing through lower flow passage 118 a one-way seal assembly 120 is positioned in a recess 122 in counter bore 110. In addition, a sand cap 124 is fastened to bottom shaft segment 36 in close proximity to the top edge of suction case collar 48 to prevent solid particles from entering lower flow passage 118 while, at the same time, providing a smooth hydrodynamic transition from suction case collar 48 to shaft segment 36. Sand cap 124 is held in position on bottom shaft segment 36 by means of a set screw 126.

The embodiment described is lubricated by two separate flows of lubricant. All of the bearings enclosed within shaft enclosing tube 44, including connector bearing 46, are lubricated by a stream of lubricant, from a source not shown, flowing downwardly within the shaft enclosing tube. After passing connector bearing 46 the lubricant flows into discharge case collar 44 and then is led out of the pump mechanism to the external surface of discharge bowl 14 by way of relief port 96. A second flow of lubricant lubricates all of the bearing surfaces of hollow drive shaft 30. The flow of lubricant, from a source not shown, is introduced into bore 52 of suction case plug 50 from lubricating line 56 connected thereto. The lubricant flows through bore 64 of tubular axle 58, out bore 62 of tubular axle extensions 60, and then flows downwardly through flow passage 67 past all of the bearing surfaces of hollow drive shaft 30, starting with upper bearing surface 84 of upper shaft segment 32 and continuing down until passing lower bearing surface 94 of bottom shaft segment 36 after which the lubricant travels upwardly through lower flow passage 118, through seals 120 and out through space 128, between sand cap 124 and suction case collar housing 48, into the low pressure area of suction case 20.

The fluid pumped has no opportunity to contact the bearing surfaces of the drive shaft. Access is prevented at the suction case collar by seals 120 and the high pressure of the lubricant flowing in lower flow passage 118. Similarly, because of the lower pressure at the exterior of discharge case 14 relative to the pressure in discharge case collar 44, the lubricant which has flowed past connector bearing 46 to the discharge case collar will be expelled through relief port 96 and carry with it any of the pumped liquid which has seeped past throttle bushing 82.

Figure 5:
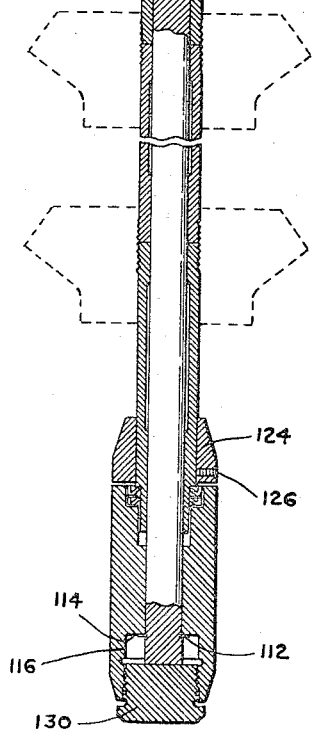
FIGURE 5 is a schematic view of another embodiment of the drive shaft apparatus for a multi-stage vertical turbine pump construction in accordance with this invention.

In the embodiment of the invention illustrated in FIGURE 5 the suction case collar 48 is closed by a solid suction case plug 130 threadably connected to the bottom of suction case collar 48. Extending from suction case collar 48 and resting upon solid suction case plug 130 is solid axle 132 rising within hollow drive shaft 30 to near the top of hollow drive shaft 30, proximate a lubricant supply shaft 136. A solid cylindrical axle extension 138 is fixed to the end of solid axle 132 and fits into counter bore 140 in the end of lubricant supply shaft 136. A shoulder 142 on cylindrical axle extension 138 and a step 144 in counter bore 140 of lubricant supply shaft 136 co-act to form a bearing seat for radial guide bearing 72. The guide bearing positions the axle extension and provides an upper flow passageway 67 from the bottom face 148 of counter bore 140 to the upper portion of hollow drive shaft 30.

Lubricant supply shaft 136 has an axial passage 150 opening on top face 148 of counter bore 140. The other end of the axial passage intersects a plurality of radial passages 152 opening on the circumference of the lubricant supply shaft at a point intermediate line shaft coupling 28 and connector bearing 46. Passages 150 and 152 communicate shaft enclosing tube 42 with flow passageway 67 to provide a flow of lubricant from the shaft enclosing tube to the bearing surfaces of hollow drive shaft 30. The lubricant flows past the bearing surfaces of hollow drive shaft 30 and out of suction case collar 48 into suction case 20 in a manner similar to that shown in the previously described embodiment of the invention.

The fluid pumped is denied access to the bearing surfaces of hollow shaft 30 as in the previously described embodiment. However, in the latter embodiment only a portion of the lubricant in shaft enclosing tube 42 passes out relief port 96. The remainder of the lubricant flows through the passageway in lubricant supply shaft 136 to lubricate the bearing surfaces of hollow drive shaft 30.

It should be noted that the invention does not require a pressure lubrication system to provide lubricant to the bearing surfaces of the hollow shaft. In both of the embodiments described herein, a suitable supply of lubricant can be provided by a gravity feed system with a source of supply at the level of the pump discharge head.

It will be understood that various changes in the details, materials, steps, and arrangements of parts which have been herein described and illustrated in order to explain the nature of the invention, may be made by those skilled in the art within the principle and scope of the invention as expressed in the appended claims.

What is claimed is:

1. Drive means for a vertical pump comprising:
   (a) a pump body having an inlet and a discharge;
   (b) a first positioning means connected to the pump body adjacent one end thereof;
   (c) an axle mounted in the first positioning means and extending along the longitudinal line of the pump body;
   (d) a hollow shaft disposed about the axle to form an annular passage between the shaft and the axle;
   (e) bearing means disposed in the annular passage to rotatably mount the hollow shaft to the axle;
   (f) a second positioning means spaced from the first positioning means and operatively connected with the pump body to position the axle and the hollow shaft;
   (g) drive means associated with the second positioning means and connected to the hollow shaft; and
   (h) at least one impeller connected to the hollow shaft.

2. The combination claimed in claim 1 including means to lubricate the bearing means disposed in the annular passage.

3. The combination claimed in claim 1 wherein the first positioning means comprises:
   (a) a first collar connected to the pump body to axially position the axle mounted therein; and
   (b) a plug connected to the first collar to support the axle and to seal the ends of the first collar from each other.

4. The combination claimed in claim 1 wherein the first positioning means comprises:
   (a) a suction case connected to the pump body, forming the inlet thereof;
   (b) a collar formed within the suction case adapted to axially guide the axle mounted therein;
   (c) a plug connected to the suction case collar at the end thereof adjacent the inlet of the pump body, to support the axle mounted in the suction case collar;
   (d) the suction case collar having a bore with a recess therein, the recess out of registration with the plug and adapted to co-act with a snap-ring; and
   (e) a snap-ring disposed on the axle to co-act with the recess in the suction case collar bore to restrict axial movement of the axle.

5. The combination claimed in claim 1 wherein the second positioning means comprises:
   (a) a second collar connected to the pump body;
   (b) a rotatable rod extending into the second collar;
   (c) bearing means coaxially aligning the rotatable rod with the second collar;
   (d) means coaxially fixing the hollow shaft to the rotatable rod, to support and position the hollow shaft; and
   (e) means rotatably positioning the end of the axle remote from the first positioning means with the rotatable rod.

6. The combination claimed in claim 5 wherein the means positioning the end of the axle remote from the first positioning means comprises:
   (a) a sleeve extending from the end of the rotatable rod adjacent the axle;
   (b) said end of the axle extending into the sleeve;
   (c) bearing means mounted between the sleeve and the axle to rotatably maintain the end of the axle in spaced relation to the sleeve.

7. The combination claimed in claim 3 including means to provide lubricant to the bearing means disposed in the annular passage comprising:
   (a) an axial bore in the axle;
   (b) a passage in the plug in registration with the axial bore of the axle;
   (c) a lubricating fluid supply line connected to the passage in the plug; and
   (d) and flow passage means communicating the axial bore with the annular passage.

8. The combination claimed in claim 5 including means to provide lubricant to the bearing means disposed in the annular passage comprising:
   (a) the rotatable rod having a flow passage therein, the first end of the flow passage opening on the surface of the rod adjacent the axle, the second end of the passage opening on the surface of the rod out of registry with the second collar;
   (b) means to provide lubricant to the second end of the flow passage in the rotatable rod; and
   (c) flow passage means communicating the first end of the passage in the rotatable rod with the annular passage.

9. The combination claimed in claim 3 and including means communicating an annular passage with the inlet of the pump body adapted for the passage of lubricant from the annular passage to said inlet comprising:
   (a) a counter bore in the first collar at the end of said collar remote from the plug;
   (b) the end of the hollow shaft extending into the counter bore in spaced relation thereto whereby the annular passage is in communication with the counter bore;
   (c) and sealing means connected to the counter bore and co-acting with the hollow shaft to provide a one directional flow passage from the bottom of the counter bore to the end of the collar remote from the plug.

10. The combination claimed in claim 1 wherein the bearing means disposed in the annular passage comprises a plurality of members protruding radially inward from the hollow shaft.

11. The combination claimed in claim 1 wherein the hollow shaft comprises:
    (a) a plurality of segments; and
    (b) coupling means connecting the segments to form an integral hollow shaft.

12. The combination claimed in claim 11 wherein the bearing means disposed in the annular passage comprises a radially inwardly protruding member at each end of the hollow shaft segments.

13. The combination claimed in claim 1 wherein each impeller is connected to the hollow shaft by connecting means comprising:
    (a) the hollow shaft having a plurality of segments;
    (b) an impeller for each pair of mutually adjacent ends of the hollow shaft segments; and
    (c) the impeller coupling the mutually adjacent ends of the hollow shaft segments to fix the impeller to the hollow shaft.

14. In a vertical turbine pump for pumping liquid having a drive motor unit, a pump body with a plurality of pumping stages including a suction case, intermediate bowl, upper bowl and a discharge case with impellers disposed in the intermediate and upper bowls, and a line shaft to transmit power from the drive motor unit to the pump body, a drive means for the pump body comprising:
    (a) a first collar formed within the suction case;
    (b) an axle mounted in the first collar and extending along the longitudinal line of the pump body;
    (c) a plug connected to the first collar to support the axle and seal the lower end of the collar;
    (d) a second collar formed in the discharge case;
    (e) a hollow shaft disposed about the axle to form an annular passage between the shaft and the axle, one end of the hollow shaft extending into the second collar means;
    (f) the impellers connected to the hollow shaft;
    (g) first bearing means disposed in the annular passage to rotatably mount the hollow shaft to the axle;
    (h) a top pump shaft coaxially connecting the line shaft with the hollow shaft;
    (i) second bearing means connected to the second collar to axially align the top pump shaft;
    (j) a sleeve protruding from the top pump shaft extending about the axle;
    (k) third bearing means disposed between the sleeve and the axle to rotatably align the axle and maintain an upper flow passage between the axle and the top pump shaft;
    (l) the lower end of the hollow shaft extending into the upper end of the first collar in spaced relation thereto to form a lower flow passage communicating the annular passage with the suction case;
    (m) sealing means connected to the first collar and co-acting with the hollow shaft to prevent flow from the suction case to the annular passage;
    (n) a throttle bushing connected with the upper bowl and the second collar and disposed about the hollow shaft to impede flow of liquid pumped by the pump into the second collar;
    (o) a radial passage in the second collar communicating the bore of the second collar with the periphery of the discharge case to exhaust pumped fluid which has flowed past the throttle bushing; and
(p) means to lubricate the first bearing means disposed in the annular passage.

15. The combination claimed in claim 14 wherein the means to lubricate the first bearing means comprises:
(a) an axial bore in the axle;
(b) a bore in the plug in registration with the bore in the axle; and
(c) a lubricant supply line connected to the bore of the plug to provide a supply of lubricant, whereby the lubricant flows up the bore in the axle, through the upper flow passages, down the annular passage and is then exhausted to the suction case through the lower flow passage.

16. The combination claimed in claim 14 wherein the means to lubricate the first bearing means comprises:
(a) a shaft enclosing tube concentrically disposed about the line shaft, connected at the bottom end thereof to the second collar;
(b) the top pump shaft having a flow passage therein, the passage communicating the bottom of the shaft in registration with the upper flow passage and the surface of the shaft at a point above the second bearing means; and
(c) means providing a flow of lubricant to the shaft enclosing tube, whereby the lubricant flows from the shaft enclosing tube through the flow passage in the top pump shaft to the upper flow passage, down the annular passage and is then exhausted to the suction case through the lower flow passage.

References Cited

UNITED STATES PATENTS

| | | |
|---|---|---|
| 1,138,408 | 5/1915 | Pierce. |
| 1,238,731 | 9/1917 | Anderson. |
| 2,621,601 | 12/1952 | Stout. |
| 2,625,290 | 1/1953 | Petrie. |
| 2,632,395 | 3/1953 | Jennings. |
| 2,678,606 | 5/1954 | Watson. |
| 2,688,929 | 9/1954 | Schleyer. |
| 2,940,658 | 6/1960 | Birmann _____ 230—207 |
| 2,795,371 | 6/1957 | Buchi _____ 230—116 |
| 2,805,819 | 9/1957 | Buchi _____ 230—116 |
| 3,058,510 | 10/1962 | Tiraspolsky. |

FOREIGN PATENTS 277,165   9/1927   Great Britain.

HENRY F. RADUAZO, *Primary Examiner.*